Aug. 22, 1961   R. M. BOZORTH   2,997,648
MAGNETIC FIELD DETECTOR
Filed Sept. 27, 1944   3 Sheets-Sheet 1

$H^2 = H_x^2 + H_y^2 + H_z^2$

INVENTOR
R. M. BOZORTH
BY
Walter M. Hill
ATTORNEY

Aug. 22, 1961    R. M. BOZORTH    2,997,648
MAGNETIC FIELD DETECTOR
Filed Sept. 27, 1944    3 Sheets-Sheet 2

INVENTOR
R. M. BOZORTH
BY
Walter M. Hill
ATTORNEY

Aug. 22, 1961    R. M. BOZORTH    2,997,648
MAGNETIC FIELD DETECTOR

Filed Sept. 27, 1944    3 Sheets-Sheet 3

INVENTOR
R. M. BOZORTH
BY
Walter M. Hill
ATTORNEY

United States Patent Office 2,997,648
Patented Aug. 22, 1961

2,997,648
MAGNETIC FIELD DETECTOR
Richard M. Bozorth, Short Hills, N.J., assignor to Bell Telephone Laboratories, Incorporated, New York, N.Y., a corporation of New York
Filed Sept. 27, 1944, Ser. No. 555,937
8 Claims. (Cl. 324—43)

This invention relates to the magnetic detection art and more particularly to a system employing a magnetic detection element, the resistance of which varies as a function of the strength of the magnetic field acting on the element.

The fact that certain metals vary in their resistance as a function of the strength of the magnetic field has been known for some time and data on these metals have been published. It has also been known that an iron-nickel alloy known as Permalloy is particularly sensitive to such variations in the strength of the magnetic field. A published report of data relating to Permalloy is given in the Physical Review, volume 36 (1930), pages 948 to 977. A peculiar fact in addition to the mere variation of resistance has also been noted with respect to magnetic materials and especially with respect to Permalloy in that the change in resistance in the low induction range obeys substantially a square law, that is to say the change in resistance varies substantially as a function of the square of the applied field strength. The operation of this invention is based upon the observation of this latter phenomenon.

It is the object of this invention to provide a simple, total field magnetic detector capable of indicating the absolute strength of a magnetic field or measuring variations thereof with respect to a reference field of magnetic intensity.

This invention attains the foregoing object by providing in combination three magnetometer elements each comprising a length of magnetically sensitive material, the change in the electrical resistivity whereof varies as the square of the strength of the magnetic field components acting in the direction of the principal axis of its length, said three magnetometers having their principal axes fixed mutually perpendicular and electrical connections serially connecting the three elements in any arbitrary order to form a resistance network, the resistance of which may be observed by an indicating instrument or otherwise used to operate other utilization means responsive thereto.

The invention may be better understood by referring to the accompanying drawings in which:

FIG. 1 schematically discloses three magnetic elements serially connected together to form a resistance network;

FIG. 2 discloses one form of magnetic element adaptable for use in this invention;

Figure 7:
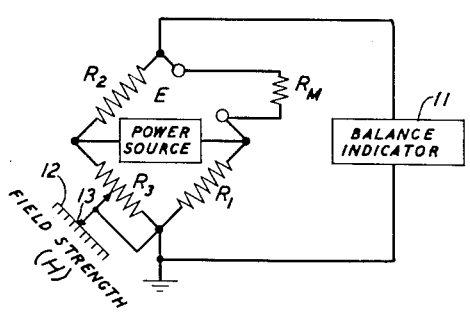
Figure 8:
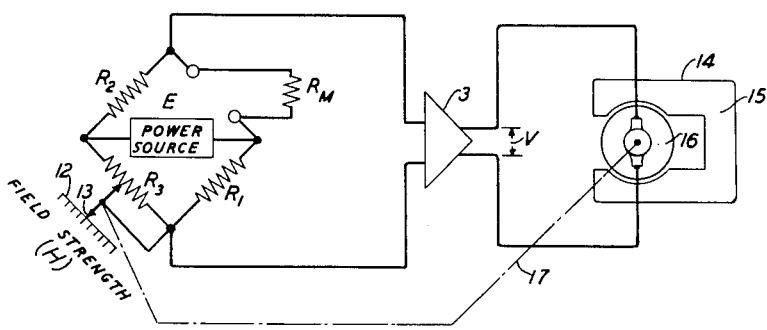
Figure 9:
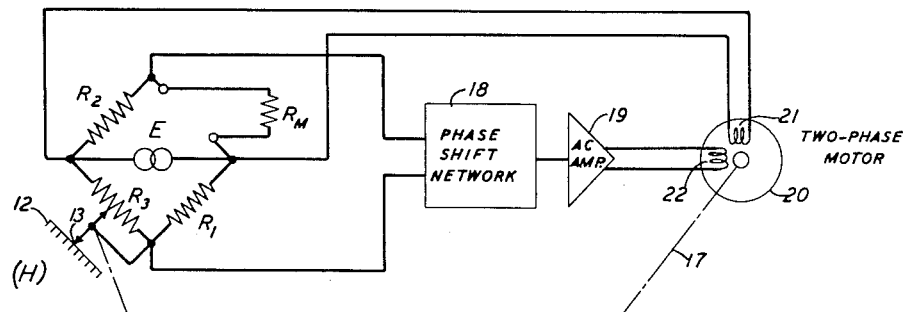
Figure 10:
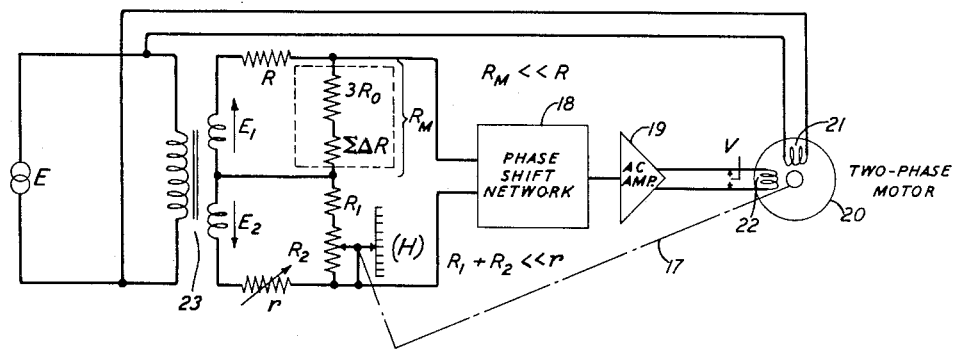
Figure 11:
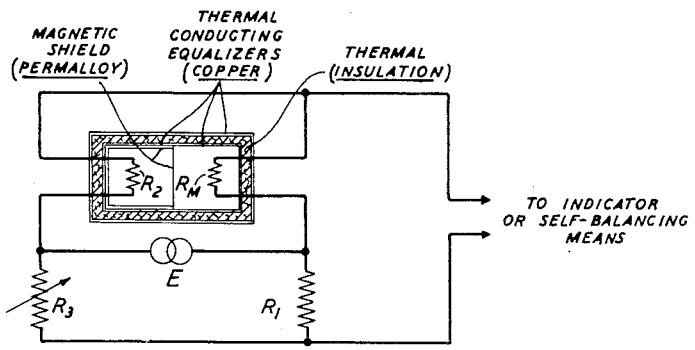

FIG. 7 discloses another embodiment of the invention wherein the field strength is indicated by the balancing potentiometer;

FIGS. 8, 9 and 10 are similar to FIG. 7 but illustrate other embodiments showing a self-balancing bridge feature; and FIG. 11 discloses one means for temperature compensation.

Figure 1:
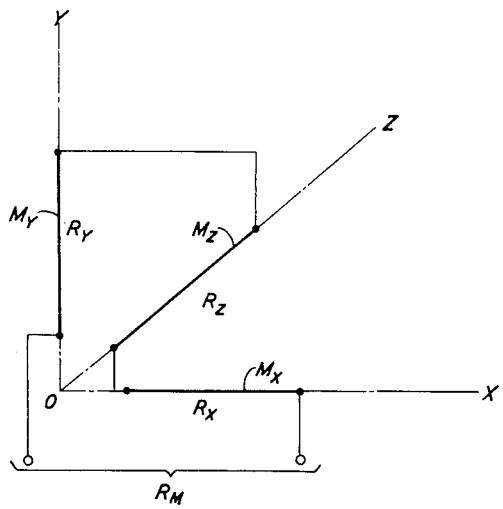

Referring now more particularly to FIG. 1, wherein is disclosed three magnetometers $M_X$, $M_Y$ and $M_Z$, the principal axes of which lie along the three mutually perpendicular Cartesian coordinates X, Y and Z, respectively. Each of these magnetometers may comprise a single length of magnetically sensitive material the resistance of which varies in proportion to the square of the strength of the component of the magnetic field that is in alignment with its principal axis. If the magnetic field assumes an angle different from exact alignment with the principal axis of one of these magnetometers, then the resistance variation in that element will vary proportionately with the square of the magnetic component of that field which lies in the direction of its principal axis. The resistances of the magnetometers may be represented by $R_X$, $R_Y$ and $R_Z$, respectively, and these resistances may be connected together in any arbitrary order, as for example the order indicated schematically in FIG. 1 to form a total series resistance equal to $R_M$. The three elements so disposed along mutually perpendicular axes will produce a variation in their series resistance $R_M$ which is proportional to the total magnetic field in which the three elements are immersed independent of their actual orientation with respect to the direction of the field. The reasons for this property of such a system will be more particularly developed in connection with the description of FIG. 3.

Figure 2:
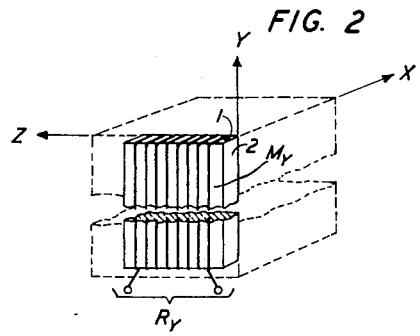

Instead of having the three magnetometer elements each comprising a single length of magnetic material, they may in the alternative each comprise a plurality of such lengths connected together in series. One convenient manner of constructing such a magnetometer is shown in FIG. 2, where, for example, magnetometer $M_Y$, having a resistance $R_Y$ is shown in the form of a winding of magnetic material 1 on a ceramic slab or block 2. The material of which the magnetically responsive magnetometer winding 1 is composed may be any material known to have the square law response characteristic. One such material known to have this property is an iron-nickel alloy known as Permalloy. This material may be wound on the ceramic block 2 and cemented or otherwise attached thereto by means of a suitable glazing material which is applied and fused in place in a manner well known in the resistance manufacturing art. A magnetometer element so constructed will have a principal axis parallel to the length of the block which may for example be the axis Y corresponding with the axis Y in FIG. 1. Three such magnetometer elements $M_X$, $M_Y$ and $M_Z$ may be mounted in any convenient manner so that their principal axes are mutually perpendicular to each other. One convenient manner of mounting them would be to mount them along three mutually adjacent edges of a cube of non-magnetic material, as for example the edges X, Y and Z of the dotted cube shown in FIG. 2.

Figure 3:
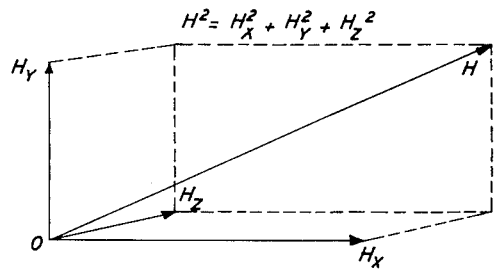
FIG. 3 is a vector diagram illustrative of the properties of this invention.

The vector diagram in FIG. 3 shows the relationship between the three components of the magnetic field H, these three components lying along the three Cartesian coordinate axes X, Y and Z. The component along the X axis is indicated by the reference letter $H_X$, along the Y axis as $H_Y$ and along the Z axis as $H_Z$. It can be shown mathematically that the sum of the squares of the three component vectors $H_X$, $H_Y$ and $H_Z$ is equal to the square of the total field vector H. Since the change in resistance of each of the magnetometer elements varies as the square of the field component along its own principal axis, it is obvious that the change in the total series-connected resistance of the three magnetometer elements will vary as the square of the absolute or total field. It is preferable that the three magnetometer elements $M_X$, $M_Y$ and $M_Z$, be constructed to be electrically and magnetically identical. This is quite easily done by using material from the same lot for constructing all three elements and by adjusting their resistances to be exactly equal when acted upon by the same field.

Mathematically the resistances of the three magnetometer elements may be expressed as follows:

$$R_X = R_0 + \Delta R_X \quad (1)$$
$$R_Y = R_0 + \Delta R_Y \quad (2)$$
$$R_Z = R_0 + \Delta R_Z \quad (3)$$

where $R_X$, $R_Y$ and $R_Z$ are respectively the total resistances of magnetometers $M_X$, $M_Y$ and $M_Z$.

$R_0$ is the resistance of each of these three magnetometers at zero field.

$\Delta R_X$, $\Delta R_Y$ and $\Delta R_Z$ are respectively the change in resistance of these elements under the field components $H_X$, $H_Y$ and $H_Z$, respectively as shown in FIG. 3.

As already stated the principle upon which this invention is based depends upon the square law relationship between the change in resistance $\Delta R_X$, $\Delta R_Y$, and $\Delta R_Z$, and the square of the corresponding field components $H_X$, $H_Y$ and $H_Z$. This relationship may be expressed mathematically as follows:

$$\Delta R_X = K H_X^2 \quad (4)$$
$$\Delta R_Y = K H_Y^2 \quad (5)$$
$$\Delta R_Z = K H_Z^2 \quad (6)$$

where the constant $K$ is a constant depending upon the dimensions and physical properties of the magnetometer material employed.

Now the sum of these resistance changes $\Delta R_X$, $\Delta R_Y$ and $\Delta R_Z$ is aqual to $\Sigma \Delta R$. This is expressed mathematically as follows:

$$\Sigma \Delta R = \Delta R_X + \Delta R_Y + \Delta R_Z \quad (7)$$

From Equations 4 to 7, inclusive, the following expression is obvious $$\Sigma \Delta R = K(H_X^2 + H_Y^2 + H_Z^2) \quad (8)$$

From the geometry of FIG. 3 it can be shown that the sum of the squares of the three component field intensities $H_X$, $H_Y$ and $H_Z$ is equal to the square of the total field vector $H$. Consequently Equation 8 will result in the expression, $$\Sigma \Delta R = K H^2 \quad (9)$$

The total series-connected resistance $R_M$ of the three magnetometers is equal to the sum of resistances $R_X$, $R_Y$ and $R_Z$. Since these resistance values are scalar quantities it is obvious that they may be connected together in any arbitrary order and in view of Equations 1 to 3, inclusive, it is obvious that the following expression may be written:

$$R_M = 3R_0 + \Sigma \Delta R = 3R_0 + K H^2 \quad (10)$$

where $R_M$ is equal to the total series-connected resistance of the three magnetometers.

In order to practice this invention, it is necessary that in some manner the relatively large residual resistance equal to $3R_0$ be balanced out. This is accomplished by the various bridge circuits shown in the remaining figures in which the total resistance of the three series-connected magnetometers $R_M$ forms a part.

Figure 4:
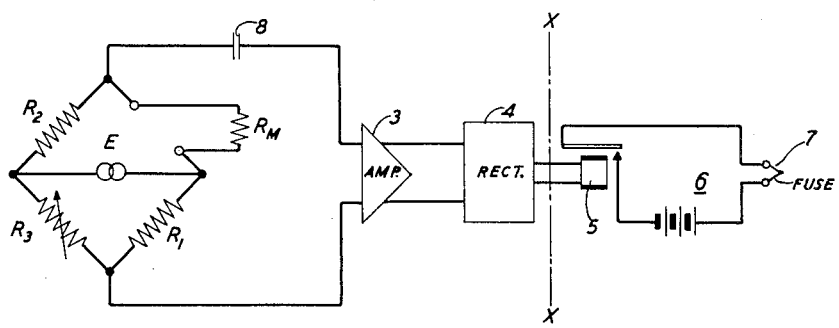
FIG. 4 is a schematic diagram of one embodiment of this invention as applied to the firing of a demolition fuse in response to a predetermined change in field strength.

In FIG. 4 the invention is applied to the firing of a demolition fuse in response to a change in the strength of the total magnetic field. It will here be observed that a bridge circuit comprising resistance arms $R_1$, $R_2$, $R_3$ and the magnetometer resistance $R_M$ forms the conventional four arms of a bridge which is energized from an alternating current source $E$. The output of this bridge is connected to the input of an alternating current amplifier 3 through a condenser 8. The output of the amplifier is rectified in a rectifier 4 and caused to energize the coil of a relay 5. The contact of this relay closes a local battery circuit 6 to fire the demolition fuse 7. The apparatus may be initially balanced by the adjustment of variable resistor $R_3$. This is done by first placing the magnetometer element in a reference field which, for example, may be the earth's field as it may exist at a particular location in a body of water where the demolition fuse is to be fired. Then by adjusting the resistance of variable resistor $R_3$, the bridge may be balanced so that the output applied to the input terminals of amplifier 3 may be zero. Now if the demolition fuse 7 is attached to a submarine mine and a vessel approaches the mine near enough to produce a distortion in the terrestrial magnetism, the intensity of the total field at the magnetometer elements will change. An alternating current output will come from the bridge, be amplified by amplifier 3, rectified by rectifier 4 and operate relay 5. This will result in the firing of fuse 7 and consequently the demolition mine attached thereto.

It is obvious that instead of operating the demolition fuse 7 and relay 5, any other apparatus which may be responsive to the rectified output from rectifier 4 may be substituted therefor and be caused to respond to this change in magnetic field strength.

Referring again to FIG. 4 it will be noted that upon adjusting variable resistor $R_3$ to balance the bridge, the bridge is balanced against a resistance $R_M$ which is equal to $3R_0$ plus the total resistance change in the three magnetometers $\Sigma \Delta R$. $\Sigma \Delta R$ is equal to the constant $K$ times the square of the total field strength $H$ as expressed in Equation 10. The total field strength $H$ will be the total field strength of the reference field at which the bridge is balanced. Should this field strength vary, the value of $\Sigma \Delta R$ will correspondingly vary in accordance with the square of this changed total field and result in a change in the resistance $R_M$, consequently unbalancing the bridge and producing an output which may be amplified and utilized as indicated above.

Figure 5:
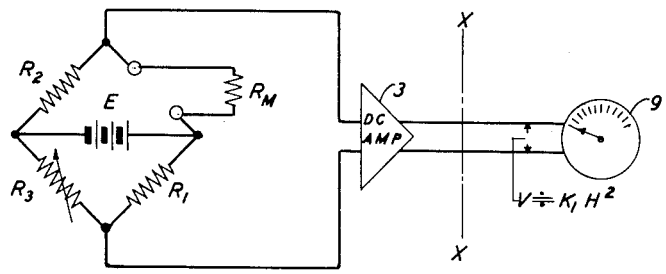
FIG. 5 is another embodiment of the invention as applied to the measurement of the absolute field strength of an unknown magnetic field.

In FIG. 5 is shown another embodiment of the invention in a bridge similar to the one shown in FIG. 4. In this circuit, however, instead of utilizing an alternating current source for voltage $E$, a direct current source schematically shown in the form of a battery is used. It may here be stated that by employing the appropriate amplifier for amplifier 3 either the alternating current source or direct current source may be used interchangeably in either of these figures. In FIG. 5 where the direct current source $E$ is shown, the output of the bridge is fed into a direct current amplifier 3, the output of which is applied to an indicating instrument 9. If the direct current source $E$ is closely regulated or otherwise maintained constant and if the change in magnetometer resistance $\Sigma \Delta R$ is small compared with $3R_0$ plus the resistance $R_2$ of the bridge, the voltage $V$ applied to the indicating instrument 9 will be substantially proportional to the square of the absolute strength of the magnetic field vector $H$. This may be expressed mathematically as follows:

$$V \doteq K_1 H^2 \quad (11)$$

where $V$ = voltage output to indicator 9
$K_1$ = constant.

The apparatus of FIG. 5 is initially adjusted to balance when the magnetometer elements represented by the resistance $R_M$ are immersed in a field of zero absolute intensity. This may be done by completely demagnetizing them within a magnetically shielded container, wherein the magnetic field is brought to zero. As this is a conventional laboratory practice it need not be described in detail. With the magnetometer elements thus placed in zero field, the bridge is balanced by adjusting the variable resistor $R_3$, just as is previously described for FIG. 4. Amplifier 3 should be designed to give a linear transmission characteristic. If it does not have the linear characteristic the indicating instrument 9 must be calibrated throughout its range with known fields being applied to the magnetometer element.

Figure 6:
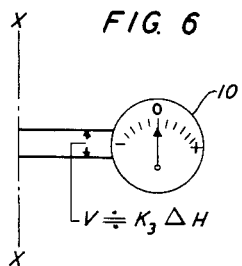
FIG. 6 is a modification of FIGS. 4 and 5 for the direct indication of the variation of field strength with respect to a reference field at which the instrument is calibrated.

In FIG. 6 is shown a zero center indicating instrument 10 which may be connected to the output of amplifier 3 in FIG. 5 or the output of rectifier 4 in FIG. 4. If the bridges of FIGS. 4 and 5 are adjusted to balance with the magnetometers immersed in a reference field as for example the strength of the terrestrial field at some arbitrary location, instrument 10 will thereafter indicate the magnitude and algebraic sign of the change in that field and the response of the instrument may be represented mathematically by the following expression:

$$V \doteq K_3 \Delta H \quad (12)$$

where $K_3$=constant
$\Delta H$=change in field strength.

Instead of employing direct indicating instruments such as indicators 9 and 10 in FIGS. 5 and 6, the variable resistor $R_3$ may be calibrated to read directly the magnitude of the field. A circuit adapted for this type of indication is shown schematically in FIG. 7, wherein the variable resistor $R_3$ is shown adjacent to a scale 12. The slider of the variable resistor $R_3$ carries a pointer 13 which coacts with scale 12 to indicate thereon the strength of the field as determined by a previous calibration. The balance indicator may be of any type and is shown generically as a block 11. The only function of this balance indicator is to indicate the condition of balance of the bridge and for this purpose any balance indicator well known in the art, such as for example the cathode-ray tube known commercially as the 6E5 tube or a zero reading galvanometer may be employed.

In FIG. 8 the bridge is shown in substantially the same form as in FIG. 7, except that in this figure, the bridge is automatically balanced by means of a motor 14. The motor 14 is shown as a reversible direct current motor having a field 15 and rotor 16. If the power source E in the bridge is a direct current source, amplifier 3 may be a direct current amplifier. On the other hand if the power source E is an alternating current source, amplifier 3 must also contain a rectifier. The output voltage V of this amplifier will vary in magnitude and direction in accordance with the direction of unbalance of the bridge. At exact balance this voltage will be zero and consequently an unbalance voltage in one direction will cause the rotor 16 to rotate in one direction whereas unbalance in the opposite direction will reverse the motor. The mechanical coupling 17 from the rotor is coupled to the slider of resistor $R_3$ in the bridge. The mechanical linkage is such that the direction of rotation of the rotor will cause the variable resistor to rebalance the bridge. Self-balancing mechanisms of this type are well known in the art and need be given no further description. One such bridge may be found by referring to United States Patent 1,086,729 to Rey, issued February 10, 1914.

FIG. 9 is another form of self-balancing bridge operating in substantially the same manner as above described for FIG. 8. This self-balancing circuit arrangement is substantially identical with that disclosed in United States Patent 1,586,233 to Anschutz-Kaempfe, issued May 25, 1926. The bridge is powered from an alternating current source E and is balanced by a variable resistor $R_3$ in substantially the same manner as described above for FIG. 8. The motive power for rebalancing the bridge is derived from a two-phase reversible motor 20. One of the phases 21 is constantly energized from the alternating current supply source E. The other phase 22 is supplied from the output of an alternating current amplifier 19 which in turn derives its current from the phase shift network 18 connected to the output terminals of the bridge. Phase shift network 18 is adapted to shift the phase of the voltage applied to winding 22 substantially 90 degrees with respect to the voltage applied to winding 21. At exact balance there will be no current coming from the output terminals of the bridge so there will evidently be no current through the phase winding 22 of the two-phase motor 20 and consequently the motor will remain stationary. When the bridge is unbalanced in one direction, the unbalance current passes through the phase-shift network 18 to the amplifier 19 and the amplifier output passes through phase winding 22 to rotate the rotor in the proper direction to rebalance the bridge. The phase shifts 180 degrees when the bridge becomes unbalanced in the opposite sense thereby reversing the rotor. As in FIG. 8, the mechanical linkage 17 connects the motor 20 to the variable resistor $R_3$.

A slightly different type of bridge network is shown in FIG. 10. In this circuit the source of alternating voltage E is applied to the primary winding of a transformer 23. This transformer has two secondary windings generating voltages $E_1$ and $E_2$, these voltages always being in phase opposition with respect to each other. Voltage $E_1$ acts through a circuit including a resistance R in series with the magnetometer resistance $R_M$. In this figure the magnetometer resistance $R_M$ is shown schematically to contain two series-connected resistors, $3R_0$ and $\Sigma \Delta R$, in accordance with Equation 10 above. It will be remembered that when the magnetometer elements are in a field of zero intensity, the quantity $\Sigma \Delta R$ becomes zero, and that it increases as the square of the absolute field intensity.

Voltage $E_2$ is caused to act through a series circuit including a resistor $r$, a fixed resistor $R_1$ and a variable resistor $R_2$. It will be clear from the above description that when the voltage drop across the magnetometer resistor $R_M$ is equal to the voltage drop across resistors $R_1$ and $R_2$, the input voltage to the phase shift network 18 will be zero. Also should the magnetometer resistance $R_M$ vary, the voltage input to phase shift network 18 will vary in magnitude and direction according to the variation in the resistance of the magnetometer element. Also as is well known in the art, this voltage may be rebalanced to zero by a proper adjustment of resistance $R_2$. It can be shown mathematically that if resistance $R_M$ is small compared with resistance R and if the sum of resistances $R_1$ and $R_2$ is small compared with the resistance $r$, that variable resistor $R_2$ may be calibrated directly in terms of the absolute field strength. The relationship between the resistance $R_2$ and the field strength is shown by the following mathematical expression $$H \doteq K_4 \sqrt{R_2} \quad (13)$$

Just as in FIG. 9 so also in FIG. 10 one of the phase windings 21 of the two-phase motor 20 is fed from the alternating current source E. The other phase winding 22 is supplied from the amplified unbalance voltage obtained across the balance network $R_1$, $R_2$, $R_M$ which is fed through the phase shift network 18 and amplified by the alternating current amplifier 19. The mechanical linkage 17 couples the two-phase motor mechanically with the variable resistance $R_2$ and is connected in the proper sense to cause the rotation of the motor to rebalance the network.

FIG. 11 discloses a temperature compensating means which may be employed in connection with the practice of this invention. It is known that the resistance of the magnetometer material varies not only as a function of the field strength but also as a function of temperature. In the prior figures it is assumed that the bridge elements are maintained at a constant temperature. Where this is impractical the magnetometer elements may be compensated by employing a similar material in one of the other arms of the bridge. For example, resistor $R_2$ in FIG. 11 may be composed of the same material as the magnetometer resistance $R_M$. In order to prevent the resistance element $R_2$ from being responsive to variations in the magnetic field, it is placed within a magnetic shield preferably of Permalloy. This magnetically shielded resistor $R_2$ is then placed within a copper enclosure which also includes the magnetometer elements of resistance $R_M$. The magnetic shield of Permalloy should have good thermal contact with the copper shield. Around this copper container may be placed a layer of thermal insulation after which a second copper container may be applied. If desired, additional alternate layers of thermal insulation and copper layers may be used. The copper layers have high thermal conductivity and act as temperature equalizers while the thermal insulation retards the flow of heat into or out of the chamber thereby preventing any rapid changes in temperature taking place. This bridge as specifically disclosed in FIG. 11 is powered from an alternating current source E although, as previously stated, this source may be a direct current source. The output of the bridge may be applied to any of the indicators or self-balancing means disclosed in the other figures.

As an alternative to the arrangement shown in FIG. 11, resistor $R_2$ may be magnetically insensitive but still have the same temperature-resistance coefficient as resistor $R_M$. With this construction, the magnetic shield around resistor $R_2$ may be eliminated. Also, if the resistors $R_2$ and $R_M$ are constructed to have good direct thermal contact with each other as where both resistors are wound on the ceramic support 2 of FIG. 2, all the thermal shielding may be eliminated.

What is claimed is:

1. A magnetic total field detector responsive to the absolute strength of the total magnetic field comprising three magnetometer elements each element comprising a length of magnetically sensitive material, the change in the electrical resistivity whereof varies substantially as the square of the strength of the magnetic field component acting in the direction of the principal axis of its length, said three magnetometers having their principal axes fixed mutually perpendicular, electrical connections serially connecting said three elements in any arbitrary order to form a resistance network of resistance equal to the sum of the resistances of the three elements, and an electrical utilization means connected to said network responsive to the change in resistance thereof.

2. A magnetic field detector responsive to the absolute strength of the total magnetic field comprising three magnetometer elements each element comprising a length of magnetically sensitive material, the change in the electrical resistivity whereof varies substantially as the square of the strength of the magnetic field component acting in the direction of the principal axis of its length, said three magnetometers having their principal axes fixed mutually perpendicular, electrical connections serially connecting said three elements in any arbitrary order to form a resistance network of resistance equal to the sum of the resistances of the three elements, an electric bridge comprising four arms, circuits connecting said network in one of said arms, a variable resistor connected in at least one other arm, and an indicating means connected to the bridge for indicating the degree of unbalance of said bridge from an initial condition of balance obtained by the adjustment of said variable resistor whereby said indication is a measure of the change in the magnetic field strength from its initial value.

3. The combination in accordance with claim 1 wherein said electrical utilization means includes an indicating meter with a scale calibrated to read directly the strength of the detected magnetic field.

4. The combination in accordance with claim 2 wherein the indicating means comprises an indicating meter with a scale calibrated to read directly the strength of the detected magnetic field.

5. The combination in accordance with claim 1 wherein said electrical utilization means includes a calibrated variable impedance means and an automatic adjusting means therefor whereby said calibrated impedance is caused to indicate directly the strength of the detected magnetic field.

6. The combination in accordance with claim 2 wherein said variable resistor is calibrated and said indicating means comprises an automatic adjusting means mechanically coupled to the variable resistor whereby said calibrated resistor is caused to indicate directly the strength of the detected magnetic field.

7. The combination in accordance with claim 1 wherein said electrical utilization means includes a temperature compensating means comprising a resistor having the same temperature-resistance coefficient as said resistance network, a magnetic shield of magnetic material surrounding the last-named resistor, and thermal equalizing means surrounding both the said network and said magnetically shielded resistor to maintain them at substantially equal temperature.

8. The combination in accordance with claim 2 wherein said bridge includes a temperature compensating means comprising a resistor having the same temperature-resistance coefficient as said resistance network, a magnetic shield of magnetic material surrounding the last-named resistor, and thermal equalizing means surrounding both the said network and said magnetically shielded resistor to maintain them at substantially equal temperature.

References Cited in the file of this patent

UNITED STATES PATENTS

| | | |
|---|---|---|
| 1,546,760 | Smith | July 21, 1925 |
| 1,832,128 | Klopsteg | Nov. 17, 1931 |
| 1,895,373 | Bruche | Jan. 24, 1933 |
| 1,896,737 | Zuschlag | Feb. 7, 1933 |
| 1,951,035 | Parker | Mar. 13, 1934 |
| 2,149,092 | Kettler | Feb. 28, 1939 |
| 2,335,117 | Harrison | Nov. 23, 1943 |
| 2,358,027 | Penther et al. | Sept. 12, 1944 |

FOREIGN PATENTS

| | | |
|---|---|---|
| 475,369 | Great Britain | Nov. 18, 1937 |